(12) United States Patent
Kwon et al.

(10) Patent No.: US 8,977,073 B2
(45) Date of Patent: Mar. 10, 2015

(54) APPARATUS AND METHOD FOR BLENDING MULTIPLE IMAGES

(75) Inventors: Jae-hyun Kwon, Yongin-si (KR); Won-hee Choe, Gyeongju-si (KR); Seong-deok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 897 days.

(21) Appl. No.: 12/619,712

(22) Filed: Nov. 17, 2009

(65) Prior Publication Data

US 2010/0150473 A1    Jun. 17, 2010

(30) Foreign Application Priority Data

Dec. 16, 2008  (KR) .................. 10-2008-0127958

(51) Int. Cl.
*G06K 9/36*     (2006.01)
*G06T 5/50*     (2006.01)

(52) U.S. Cl.
CPC ..................................... *G06T 5/50* (2013.01)
USPC ........................... 382/284; 382/162; 382/274

(58) Field of Classification Search
USPC ................................. 382/162, 154, 274, 284
See application file for complete search history.

(56) References Cited

U.S. PATENT DOCUMENTS

| | | | |
|---|---|---|---|
| 5,612,786 A * | 3/1997 | Huber et al. .................. | 356/604 |
| 5,828,793 A | 10/1998 | Mann | |
| 6,204,881 B1 | 3/2001 | Ikeda et al. | |
| 6,404,516 B1 * | 6/2002 | Edgar .......................... | 358/487 |
| 6,720,993 B1 | 4/2004 | Hwang et al. | |
| 6,738,510 B2 | 5/2004 | Tsuruoka et al. | |
| 7,120,293 B2 * | 10/2006 | Schoelkopf et al. .......... | 382/162 |
| 7,202,892 B1 | 4/2007 | Ogata et al. | |
| 7,274,771 B2 * | 9/2007 | Allred et al. ................ | 378/98.12 |
| 7,492,375 B2 * | 2/2009 | Toyama et al. ............... | 345/629 |
| 7,612,804 B1 * | 11/2009 | Marcu et al. ................ | 348/222.1 |
| 7,636,098 B2 * | 12/2009 | Yang et al. .................... | 345/629 |
| 7,796,872 B2 * | 9/2010 | Sachs et al. ..................... | 396/55 |
| 7,822,289 B2 * | 10/2010 | Szeliski ......................... | 382/276 |
| 7,825,969 B2 * | 11/2010 | Tico et al. ..................... | 348/273 |
| 8,098,957 B2 * | 1/2012 | Hwang et al. ................. | 382/294 |

(Continued)

FOREIGN PATENT DOCUMENTS

| | | |
|---|---|---|
| JP | 11-317905 | 11/1999 |
| JP | 2001-238128 A | 8/2001 |

(Continued)

OTHER PUBLICATIONS

European Search Report issued on Mar. 10, 2010, in corresponding European Application No. 09178795.2 (9 pages).

(Continued)

*Primary Examiner* — Aaron W Carter
(74) *Attorney, Agent, or Firm* — NSIP Law (57) ABSTRACT

Disclosed is an apparatus to blend a high dynamic range (HDR) image or a plurality of images captured with different exposure settings to multiple images, and a method thereof. A multiple image blender receives a high dynamic range (HDR) image or a plurality of images captured with different exposure settings, and controls setting of one or more areas of interest or setting of one or more gradation levels, and combines and blends the HDR image or the plurality of images captured with different exposure settings corresponding to each area of interest or at each gradation level, and generates at least one multi-exposure image.

13 Claims, 5 Drawing Sheets

(56) References Cited

U.S. PATENT DOCUMENTS

| | | | |
|---|---|---|---|
| 8,115,821 | B2 | 2/2012 | Maki et al. |
| 8,144,985 | B2 * | 3/2012 | Ciurea et al. ................ 382/168 |
| 2005/0104900 | A1 * | 5/2005 | Toyama et al. ............... 345/629 |
| 2005/0288580 | A1 | 12/2005 | Lagrange et al. |
| 2006/0177150 | A1 * | 8/2006 | Uyttendaele et al. ......... 382/284 |
| 2006/0192867 | A1 * | 8/2006 | Yosefin ......................... 348/273 |
| 2006/0239579 | A1 * | 10/2006 | Ritter ............................ 382/274 |
| 2006/0251216 | A1 * | 11/2006 | Allred et al. ................. 378/98.12 |
| 2007/0025717 | A1 * | 2/2007 | Raskar et al. ................. 396/155 |
| 2007/0025720 | A1 * | 2/2007 | Raskar et al. ................. 396/213 |
| 2008/0187235 | A1 * | 8/2008 | Wakazono et al. ........... 382/255 |
| 2009/0040337 | A1 * | 2/2009 | Vitsnudel et al. .......... 348/229.1 |
| 2009/0091645 | A1 * | 4/2009 | Trimeche et al. ............. 348/273 |
| 2009/0202176 | A1 * | 8/2009 | Hwang et al. ................. 382/294 |
| 2012/0044381 | A1 * | 2/2012 | Jannard et al. ............ 348/229.1 |
| 2014/0193097 | A1 * | 7/2014 | Park et al. ..................... 382/284 |

FOREIGN PATENT DOCUMENTS

| | | |
|---|---|---|
| JP | 2003-158669 | 5/2003 |
| JP | 2004-72655 A | 3/2004 |
| KR | 2001-0036040 B | 5/2001 |

OTHER PUBLICATIONS

Benjamin Guthier et al, "Capturing High Dynamic Range Images with Partial Re-expostures," In *Proc. of the 2008 IEEE 10$^{th}$ Workshop on Multimedia Signal Processing* (MMSP 2008), Oct. 8, 2008, pp. 241-249, IEEE, Piscataway, NJ, USA.

Tom Mertens et al, "Exposure Fusion," *In Proc. of the 15$^{th}$ Pacific Conference on Computer Graphics and Applications*, Oct. 29, 2007, pp. 382-390, IEEE, Piscataway, NJ, USA.

A. Ardeshir Goshtasby, "Fusion of Multi-Exposure Images," *Image and Vision Computing*, Jun. 1, 2005, pp. 611-618, vol. 23, No. 6, Elsevier, Guildford, GB.

Radu Ciprian Bilcu et al, "High Dynamic Range Imaging on Mobile Devices," *In Proc. of the 15$^{th}$ IEEE International Conference on Electronics, Circuits, and Systems*, 2008 (ICECS 2008), Aug. 31, 2008, pp. 1312-1315, IEEE, Piscataway NJ, USA.

Korean Office Action mailed Oct. 20, 2014 in counterpart Korean Application No. 10-2008-0127958 (9 pages, in Korean, with partial English translation).

* cited by examiner

APPARATUS AND METHOD FOR BLENDING MULTIPLE IMAGES

CROSS-REFERENCE TO RELATED APPLICATION

This application claims the benefit under 35 U.S.C. §119(a) of a Korean Patent Application No. 10-2008-0127958, filed Dec. 16, 2008, the disclosure of which is incorporated herein by reference in its entirety for all purposes.

BACKGROUND

1. Field

The following description relates to image processing, and more particularly, to a technology of blending a high dynamic range (HDR) image or a plurality of images captured with different exposure settings to create multiple images.

2. Description of the Related Art

A dynamic range (DR) of a digital image is defined as a ratio of a brightness of a darkest pixel of the digital image with respect to a brightness of a brightest pixel of the digital image. However, human visual response is measured by a system known as the Human Visual System (HVS), which has a dynamic range which is much higher than dynamic ranges of conventional imaging devices such as digital cameras and monitors. In other words, the conventional imaging devices cannot capture or display all images visible to the naked human eye. Recently, demand has increased with regard to high dynamic range (HDR) images having high dynamic ranges that cannot be processed by existing conventional imaging devices.

Various methods of generating HDR images exist, and one such method is to expand the dynamic range of images by blending a plurality of images with different exposure settings.

Accordingly, there exists a conventional method of expanding the dynamic range of images by acquiring a plurality of images captured with different exposure settings, calculating an average luminance of the images and adjusting gains to be applied to the images based on the average luminance. Also, there exists another conventional method of, compensating for a luminance of each of a plurality of short-exposure or long-exposure images based on predetermined exposure settings after the images have been acquired, and then blending the images.

However, the conventional image blending methods described above may deteriorate picture quality when applied to displays with small dynamic ranges (DRs).

SUMMARY

In one general aspect, there is provided a multiple image blender including a controller to receive a high dynamic range (HDR) image or a plurality of images captured with different exposure settings, and control setting of one or more areas of interest or setting of one or more gradation levels, and an image processor to combine and blend the HDR image or the plurality of images with different exposures corresponding to each area of interest or at each gradation level, and generate at least one multi-exposure image.

The multiple image blender may further include a weight generator to generate a weight to perform image blending corresponding to each area of interest or at each gradation level, wherein the image processor generates the at least one multi-exposure image by processing the HDR image or the plurality of images captured with different exposure settings according to the weight.

The multiple image blender may further include an image acquiring unit to generate the plurality of images captured with different exposure settings or receive the HDR image. The controller may further include an area-of-interest setter to set, as being an area of interest, an area focused automatically where the HDR image or the plurality of images captured with different exposure settings are acquired.

The image acquiring unit may adjust an exposure time of each image such that dynamic ranges of the images overlap each other, where the plurality of images captured with different exposure settings are acquired.

The controller may set the area of interest based on information about extracted edge components or according to a user's input.

The controller may perform gradation analysis to determine a gradation level to which a large portion of pixel values of each image belongs, and may set the determined gradation level to an optimal gradation level.

In another general aspect, there is provided a multiple image blending method including receiving a high dynamic range (HDR) image or a plurality of images captured with different exposure settings, setting at least one gradation level, and generating at least one multi-exposure image by combining and blending the HDR image or the plurality of images captured with different exposure settings corresponding to each gradation level.

The generating of the at least one multi-exposure image may include generating the at least one multi-exposure image by generating a weight to perform image blending corresponding to each of the at least one gradation level, and processing the HDR image or the plurality of images captured with different exposure settings according to the weight.

The receiving of the HDR image or the plurality of images captured with different exposure settings may include adjusting an exposure time of each image such that dynamic ranges of the images overlap each other, where the plurality of images captured with different exposure settings are acquired.

The generating of the at least one multi-exposure image may include performing gradation analysis to determine a gradation level to which a large portion of pixel values of each image belongs and setting the determined gradation level to an optimal gradation level.

In another general aspect, there is provided a multiple image blending method including receiving a high dynamic range (HDR) image or a plurality of images captured with different exposure settings, setting at least one area of interest, and generating at least one multi-exposure image by combining and blending the HDR image or the plurality of images captured with different exposure settings corresponding to each area of the at least one area of interest.

The generating of the at least one multi-exposure image may include generating the at least one multi-exposure image by generating a weight to perform image blending corresponding to each of the at least one area of interest and processing the HDR image or the plurality of images captured with different exposure settings according to the weight.

The setting of the at least one area of interest may include setting, as being an area of interest, an area focused automatically where the HDR image or the plurality of images captured with different exposure settings are acquired.

The receiving of the HDR image or the plurality of images captured with different exposure settings may include adjusting an exposure time of each image such that dynamic ranges of the images overlap each other, where the plurality of images captured with different exposure settings are acquired.

The setting of the area of interest may include setting the area of interest based on information about extracted edge components or according to a user's input.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses, and/or methods described herein will likely suggest themselves to those of ordinary skill in the art. Also, descriptions of well-known functions and constructions may be omitted for increased clarity and conciseness.

Figure 1:
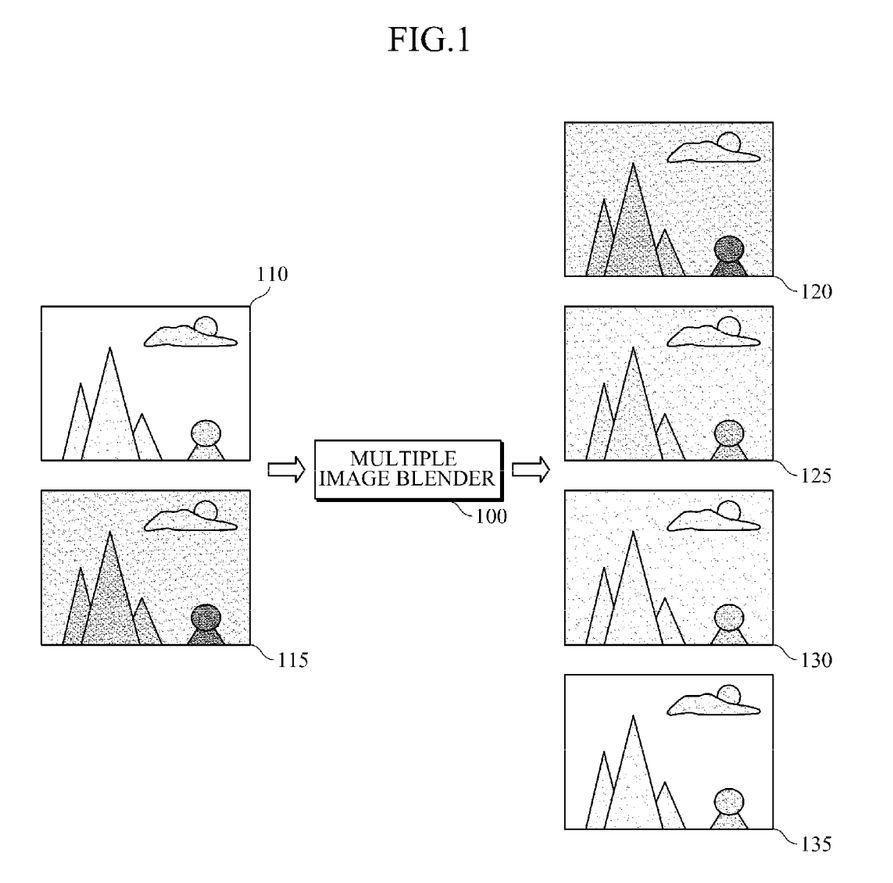
FIG. 1 is a view illustrating an exemplary method of generating multiple images based on gradation levels.

FIG. 1 illustrates an exemplary method of generating multiple images based on gradation levels.

Referring to FIG. 1, a multiple image blender 100 receives a plurality of images of a scene created using different exposure settings and blends the images to generate multiple images. For example, the multiple image blender 100 receives a long-exposure image 110 and a short-exposure image 115 and blends the long-exposure image 110 and the short-exposure image 115 to generate a plurality of images 120, 125, 130 and 135. Further description regarding the aforementioned image blending will be described with reference to FIG. 2.

As another example, the multiple image blender 100 may, instead of receiving a plurality of images captured with different exposure settings, receive a single high dynamic range (HDR) image. In this case, the multiple image blender 100 may blend the HDR image to generate the plurality of images 120, 125, 130 and 135 to have different gradation levels.

Figure 2:
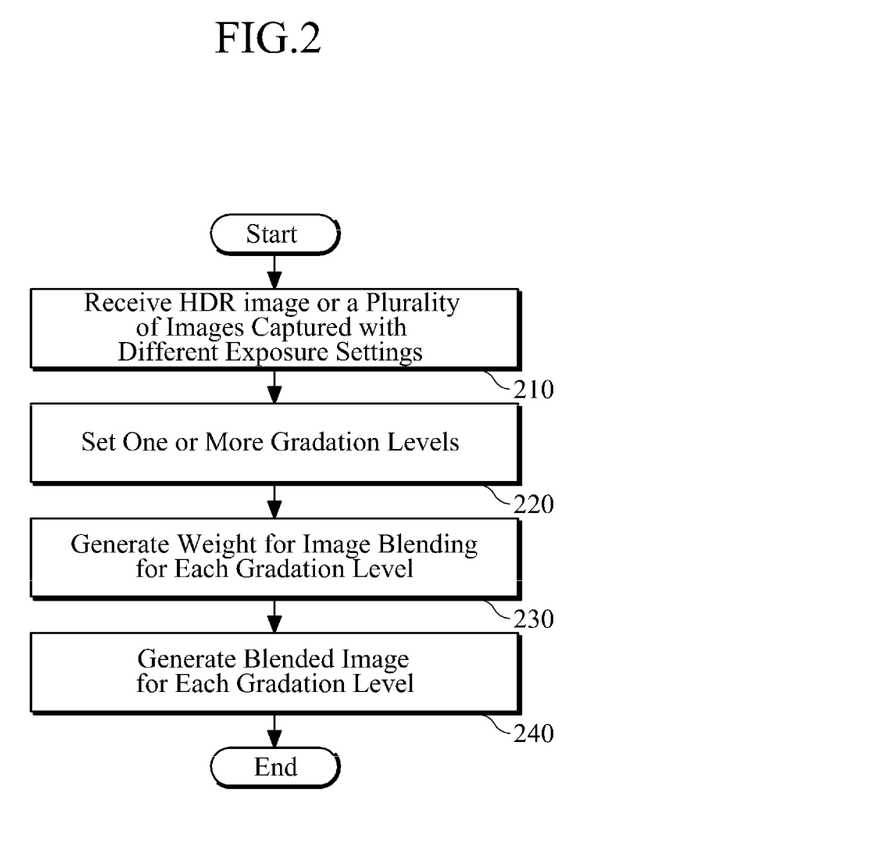
FIG. 2 is a flowchart illustrating an exemplary method of generating multiple images based on gradation levels.

FIG. 2 illustrates an exemplary method of generating multiple images based on gradation levels.

A single HDR image or a plurality of images captured with different exposure settings are received (in 210). One or more gradation levels are set (in 220), and the HDR image or the plurality of images captured with different exposure settings are combined and blended in correspondence with each gradation level to generate a plurality of multi-exposure images (in 230). For example, after the one or more gradation levels are set, a weight to perform the image blending is calculated at each gradation level, and the HDR image or the plurality of images with different exposures are blended according to the corresponding weights to generate the plurality of multi-exposure images (in 240).

Where data of a short-exposure image is represented by SEI, data of a long-exposure image is represented by LEI, and characteristic functions corresponding to gradation optimization (histogram optimization and the like) of the respective images are represented by f(·) and g(·), respectively, then blended image data (HDRI) according to an exemplary embodiment may be calculated as in Equation 1, below.

$$HDRI = \alpha \cdot f(SEI) + \beta \cdot g(LEI) \quad \text{[Equation 1]}$$

Here, $\alpha$ and $\beta$ are weights which are applied to blend gradation images, and by differentiating the weights $\alpha$ and $\beta$, a range of representable gradation levels may be adjusted.

When the plurality of images with different exposures are acquired, an exposure time of each image may be adjusted such that the dynamic ranges of the images are each overlapped. Also, gradation analysis may be performed so that a gradation level to which a large portion of pixel values of each image belongs may be determined, and the determined gradation level may be set to an optimal gradation level of the image.

Figure 3:
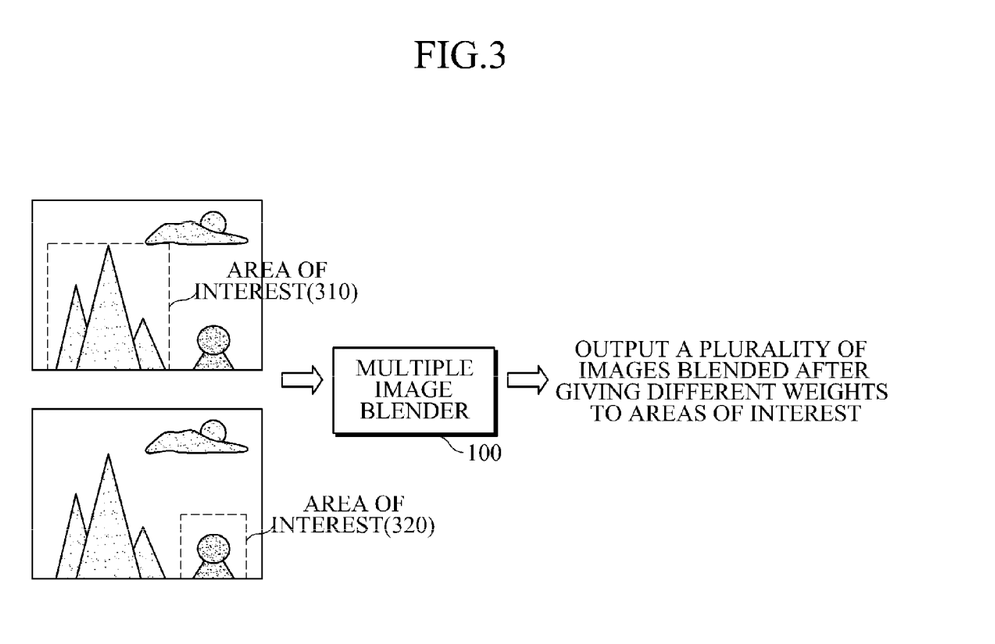
FIG. 3 is a view illustrating another exemplary method of generating multiple images based on areas of interest.

FIG. 3 illustrates an exemplary method of generating multiple images based on areas of interest.

Referring to FIG. 3, a multiple image blender 100 designates one or more areas of interest of a scene 310, 320 and blends received images while assigning different weights to the areas of interest 310, 320.

For example, received images are blended based on a gradation level of an area of interest to the user so that the area of interest can be shown more clearly. At this time, a plurality of blended images with different gradation levels may be generated according to a number of areas of interest to allow a user to select a desired image from among the plurality of blended images.

Figure 4:
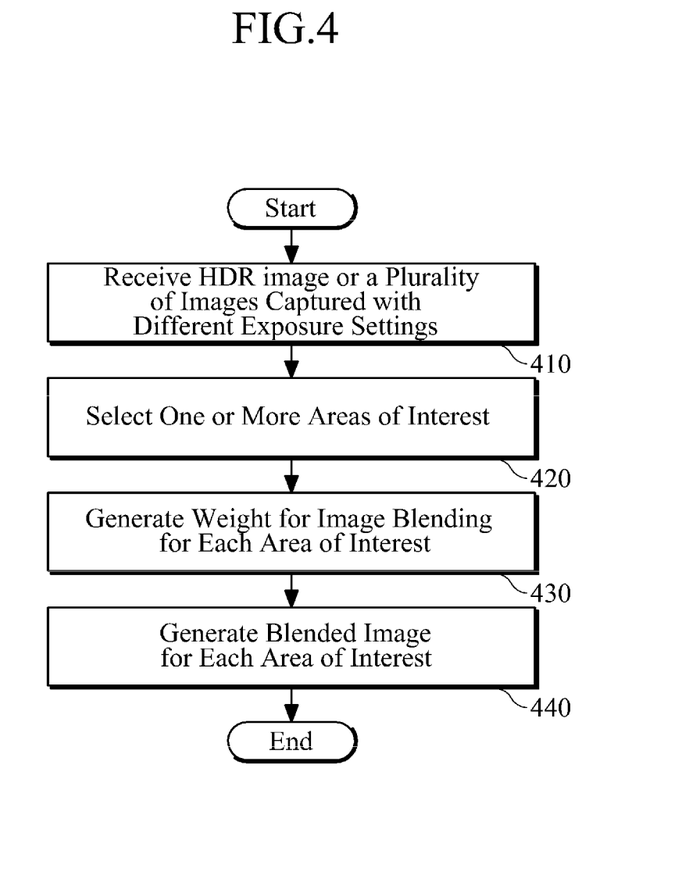
FIG. 4 is a flowchart of an exemplary method of generating multiple images based on areas of interest.

FIG. 4 illustrates an exemplary method of generating multiple images based on areas of interest.

A HDR image or a plurality of images with different exposures are received (in 410). Where the plurality of images with different exposures are acquired, the exposure times may be adjusted so that the dynamic ranges of the images acquired respectively at the exposure times overlap each other.

Then, one or more areas of interest are set (in 420). At this time, the area of interest may be an area focused automatically when the image is acquired, or may be set based on information about extracted edge components or according to a user's input. That is, according to an edge component extracting method, for example, extracting the contour of a person's face or the edge of a certain object, an area where a specific object is located may be set as being an area of interest. As another example, it is possible to allow a user to set a particular area as being an area of interest in advance.

Then, the HDR image or the plurality of images captured with different exposure settings are combined and blended with respect to each area of interest to generate a plurality of multi-exposure images. Referring back to FIG. 4, a weight to perform the image blending is generated at each area of interest (in 430), and the HDR image or the plurality of images captured with different exposure settings are processed according to the weights, so that a plurality of multi-exposure images are generated (in 440). The above Equation 1 may be used to generate blended images according to weights. As described above, $\alpha$ and $\beta$ are weights corresponding to each area of interest which are applied when blending images, and by differentiating the weights α and β in each area of interest, various blended images may be generated.

Figure 5:
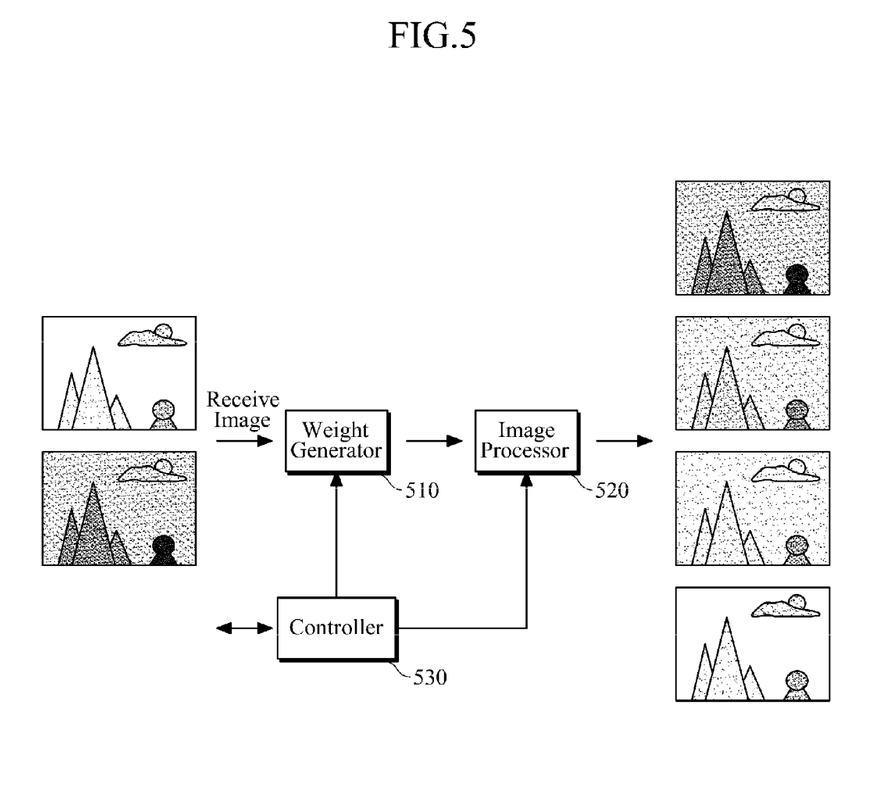
FIG. 5 illustrates an exemplary configuration of a multiple image generator.

FIG. 5 illustrates a configuration of a multiple image generator.

The multiple image generator includes a weight generator 510, an image processor 520 and a controller 530.

The controller 530 receives a HDR image or a plurality of images with different exposures, and controls the setting of one or more areas of interest and the setting of desired gradation levels. The controller 530 may include an area-of-interest setter (not illustrated) to set an area which is focused automatically when an image is acquired as being an area of interest. The area-of-interest setter may set an area of interest based on information about extracted edge components or according to a user's input. Also, the area-of-interest setter may perform gradation analysis to determine a gradation level to which a large portion of pixel values of an image belongs, and set the determined gradation level to an optimal gradation level.

The image processor 520 combines and blends the HDR image or the plurality of images captured with different exposure settings corresponding to each area of interest or at each gradation level to generate a plurality of multi-exposure images. For example, the weight generator 510 generates a weight to perform the image blending at each area of interest or at each gradation level set by the controller 530, and the image processor 520 processes the HDR image or the images captured with different exposure settings according to the weights to generate a plurality of blended images.

Meanwhile, the multiple image generator may further include an image acquiring unit (not illustrated) to generate the plurality of images with different exposures or receive the HDR image. That is, the image acquiring unit may acquire images by photographing a scene or by externally receiving a HDR image. Also, where a plurality of images captured with different exposure settings is acquired, the image acquiring unit may adjust an exposure time of each image such that the dynamic ranges of the images overlap each other.

According to certain example(s) described above, instead of a single HDR image, a plurality of HDR images with different gradation distributions corresponding to each area of interest or corresponding to each gradation level can be created.

Also, according to certain example(s) described above, a camera user may, by only using one photographing operation, attain an effect of taking many images of a scene using different exposure times/settings. Furthermore, since luminance band compression is performed with a high dynamic range (HDR), clear images rather than those photographed many times using different exposure times/settings using a low dynamic range (LDR) camera may be acquired.

The methods described above of generating multiple images may be recorded, stored, or fixed in one or more computer readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape, optical media such as CD ROM disks and DVDs, magneto-optical media such as optical disks, and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer readable storage medium may be distributed among computer systems connected through a network and computer-readable codes or program instructions may be stored and executed in a decentralized manner.

A number of example exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multiple image blender, comprising:
   a controller to receive a single high dynamic range (HDR) image of a scene, and to control setting of a plurality of areas of interest in the HDR image and setting of a gradation level for each area of interest; and
   an image processor to blend the HDR image corresponding to each area of interest by assigning different long-exposure and short-exposure weights to the areas of interest at each respective gradation level, to generate a plurality of multi-exposure images according to a number of areas of interest with different gradation distributions that comprise a range of gradation between a lightest gradation level to a darkest gradation level, from among the gradation levels of the plurality of areas of interest.

2. The multiple image blender of claim 1, further comprising:
   an image acquiring unit to generate or receive the HDR image.

3. The multiple image blender of claim 2, wherein the controller further comprises:
   an area-of-interest setter to set, as being an area of interest, an area focused automatically when the HDR image is acquired.

4. The multiple image blender of claim 2, wherein the image acquiring unit adjusts an exposure time of the HDR image such that dynamic ranges of the plurality of multi-exposure images overlap each other.

5. The multiple image blender of claim 1, wherein the controller sets an area of interest based on information about extracted edge components or according to a user's input.

6. The multiple image blender of claim 1, wherein the number of multi-exposure images generated equals the number of areas of interest.

7. A multiple image blending method, the method comprising:
   receiving a single high dynamic range (HDR) image of a scene;
   setting a plurality of areas of interest in the HDR image and setting a gradation level for each area of interest; and
   generating a plurality of multi-exposure images by blending the HDR image corresponding to each area of interest by assigning different long-exposure and short-exposure weights to the areas of interest at each respective gradation level to generate a plurality of multi-exposure images according to a number of areas of interest with different gradation distributions that comprise a range of gradation between a lightest gradation level to a darkest gradation level, from among the set gradation levels.

8. The multiple image blending method of claim 7, wherein the receiving of the HDR image comprises:
adjusting an exposure time of the HDR image such that dynamic ranges of the multi-exposure images overlap each other.

9. The multiple image blending method of claim 7, wherein the number of multi-exposure images generated equals the number of gradation levels.

10. A multiple image blending method, the method comprising:
receiving a high dynamic range (HDR) image of a scene, the HDR image comprising a short-exposure image (SEI) and a long-exposure image (LEI) of the scene;
setting a plurality of areas of interest in the HDR image and setting of a gradation level for each area of interest; and
generating a plurality of multi-exposure images by blending the HDR image corresponding to each area of interest by assigning different long-exposure and short-exposure weights to the areas of interest at each respective gradation level, to generate a plurality of multi-exposure images according to a number of areas of interest with different gradation distributions that comprise a range of gradation between a lightest gradation level to a darkest gradation level, from among the gradation levels of the plurality of areas of interest.

11. The multiple image blending method of claim 10, wherein the setting of the plurality of areas of interest comprises:
setting, as being an area of interest, an area focused automatically when the HDR image is acquired.

12. The multiple image blending method of claim 10, wherein the receiving of the HDR image comprises:
adjusting an exposure time of the HDR image such that dynamic ranges of the plurality of multi-exposure images overlap each other.

13. The multiple image blending method of claim 10, wherein the setting of an area of interest comprises:
setting the area of interest based on information about extracted edge components or according to a user's input.

* * * * *